United States Patent [19]

Siebentritt, Jr. et al.

[11] Patent Number: 5,426,305

[45] Date of Patent: Jun. 20, 1995

[54] HERMETICALLY SEALED PLASTIC RADIATION DETECTOR

[75] Inventors: Carl R. Siebentritt, Jr., Leesburg, Va.; Darryl R. Charbonneau, Bottineau, N. Dak.

[73] Assignee: The United States of America as represented by the Secretary of the Army, Washington, D.C.

[21] Appl. No.: 299,041

[22] Filed: Aug. 26, 1994

[51] Int. Cl.6 .................... G01T 1/18; G01T 1/185
[52] U.S. Cl. ................................... 250/374; 250/376
[58] Field of Search ............... 250/374, 376, 377, 378

[56] References Cited

U.S. PATENT DOCUMENTS

| 4,306,154 | 12/1981 | Williams, Jr. et al. | |
|---|---|---|---|
| 4,617,465 | 10/1986 | Yoshida | 250/374 X |
| 4,622,466 | 11/1986 | Tamura | 250/374 |
| 4,697,084 | 9/1987 | Fox | 250/376 |
| 5,039,572 | 8/1991 | Bobsein et al. | 428/408 |

*Primary Examiner*—Constantine Hannaher
*Assistant Examiner*—Edward J. Glick
*Attorney, Agent, or Firm*—Michael Zelenka; William H. Anderson

[57] ABSTRACT

The radiation detector includes a housing formed of a liquid crystal polymer or polyphenylene sulfide treated with a gas plasma and reinforced with carbon fibers. Further, the detector includes components, such as the eye lens, window and charging switch, formed of injection molded phenoxy resin. With these improvements, the radiation detector can withstand colder temperatures, greater thermal and mechanical shock and higher humidity.

15 Claims, 3 Drawing Sheets

HERMETICALLY SEALED PLASTIC RADIATION DETECTOR

GOVERNMENT INTEREST

The invention described herein may be made, sold, used or licensed by, or on behalf of, the United States of America without the payment to us of any royalties thereon.

FIELD OF THE INVENTION

This invention relates generally to radiological instruments based on either ionization chambers, proportional counters or Geiger Muller radiation counters, and more particularly with respect to such meters that must be ruggedized to withstand high altitude, moisture, extreme temperatures, and thermal and mechanical shock.

BACKGROUND OF THE INVENTION

Heretofore, higher quality radiation detectors, including those based on ion chambers and proportional counters, have been hermetically sealed in order to provide long term stability with respect to the calibration accuracy and precision of the detector. This type of seal has led to the use of metals, glasses and ceramics and the associated sophisticated sealing processes in order to achieve the desired performance. The use of these materials, while providing the requisite seal introduces other problems including: limitations on the range of radiation energies that could be detected and/or measured; long term stability problems due to surface corrosion or passivation; poor resistance to shock and rough handling, e.g. metal to glass seals used for dosimeter charging switches short out the dosimeter when the instrument is dropped; materials used are not similar to tissue equivalent or air equivalent; and the materials used are not conducive to mass production requirements for civil defense.

Because dosimeters for civil defense must be made on a surge demand, dosimeters for civil defense have been made of injection molded plastic in order to take advantage of lower material and labor costs. These dosimeters were generally adequate for this purpose because the accuracy requirements are not strict. An accuracy of ±30% is adequate for making proper operational decisions which is well within the tolerances of plastic dosimeters. The accuracy of plastic dosimeters only varies as much as ±15%. However, these devices must be impervious to water vapor and mechanical shock in order to be used effectively in the expected high humidity and harsh conditions of the fallout shelter environment.

An example of a dosimeter which was designed for civil defense purposes and which is relevant to the present invention is disclosed in U.S. Pat. No. 4,306,154, issued on Dec. 15, 1981 to Williams et al and entitled, "Dosimeter." This U.S. Patent is incorporated herein by reference. It has been found, however, that the device described in this patent will not provide adequate operation in moist climates as well as after the device has experienced mechanical shock.

SUMMARY OF THE INVENTION

Accordingly, it is general object of the invention to provide for an improved radiation metering device which is relatively inexpensive and which can withstand a harsh environment.

Another object of the invention is to provide for such a metering device that has a sustained calibration stability under a wide range of operating conditions so that it can be used for all types of personnel monitoring (e.g. nuclear power plants).

A still further object of the invention is to provide for such a metering device that can be mass produced in time of critical need (e.g. nuclear crisis and/or war).

These and other objects of the present invention are achieved by improving upon known radiation metering devices. Specifically, the present invention anticipates using a liquid crystal polymer, polyphenylene sulfide, or other suitable crystalline polymer treated with a gas plasma and reinforced with carbon fibers. Further, the present invention anticipates the use of injection molded phenoxy resin for the optical components, such as the window, eye lens and charging switch.

With these improvements, the present invention can withstand colder temperatures, greater mechanical shock and higher humidity than any radiation metering device thus disclosed.

BRIEF DESCRIPTION OF THE DRAWINGS

These and other features of the invention will be better understood in light of the following Detailed Description of the Invention and the drawings wherein.

DETAILED DESCRIPTION OF THE INVENTION

Figure 1:
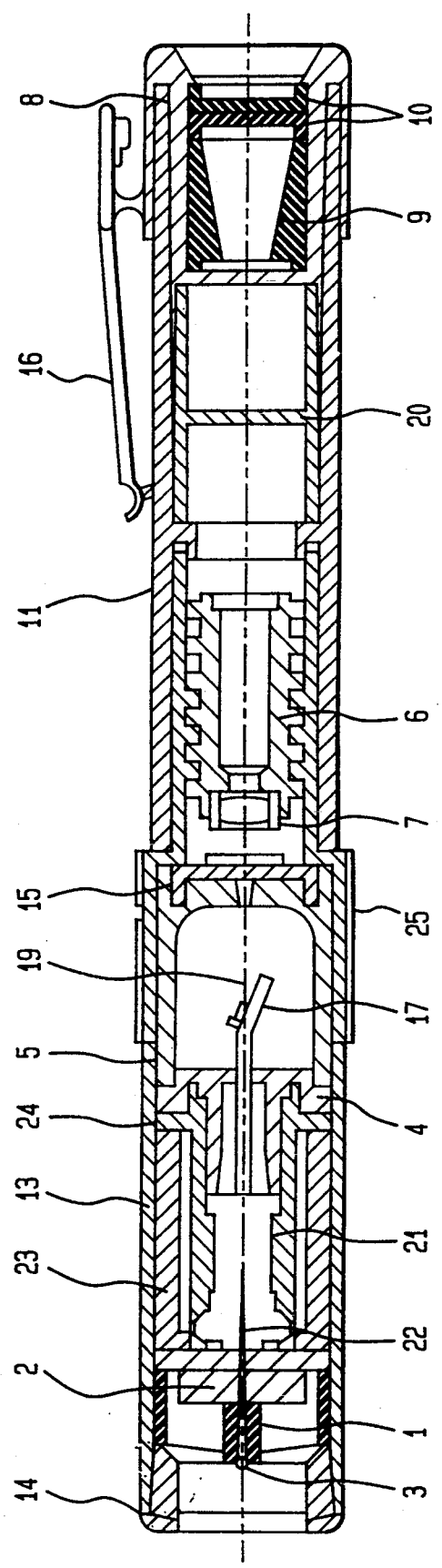
FIG. 1 is a cross-sectional view of one embodiment of a dosimeter.
Figure 2:
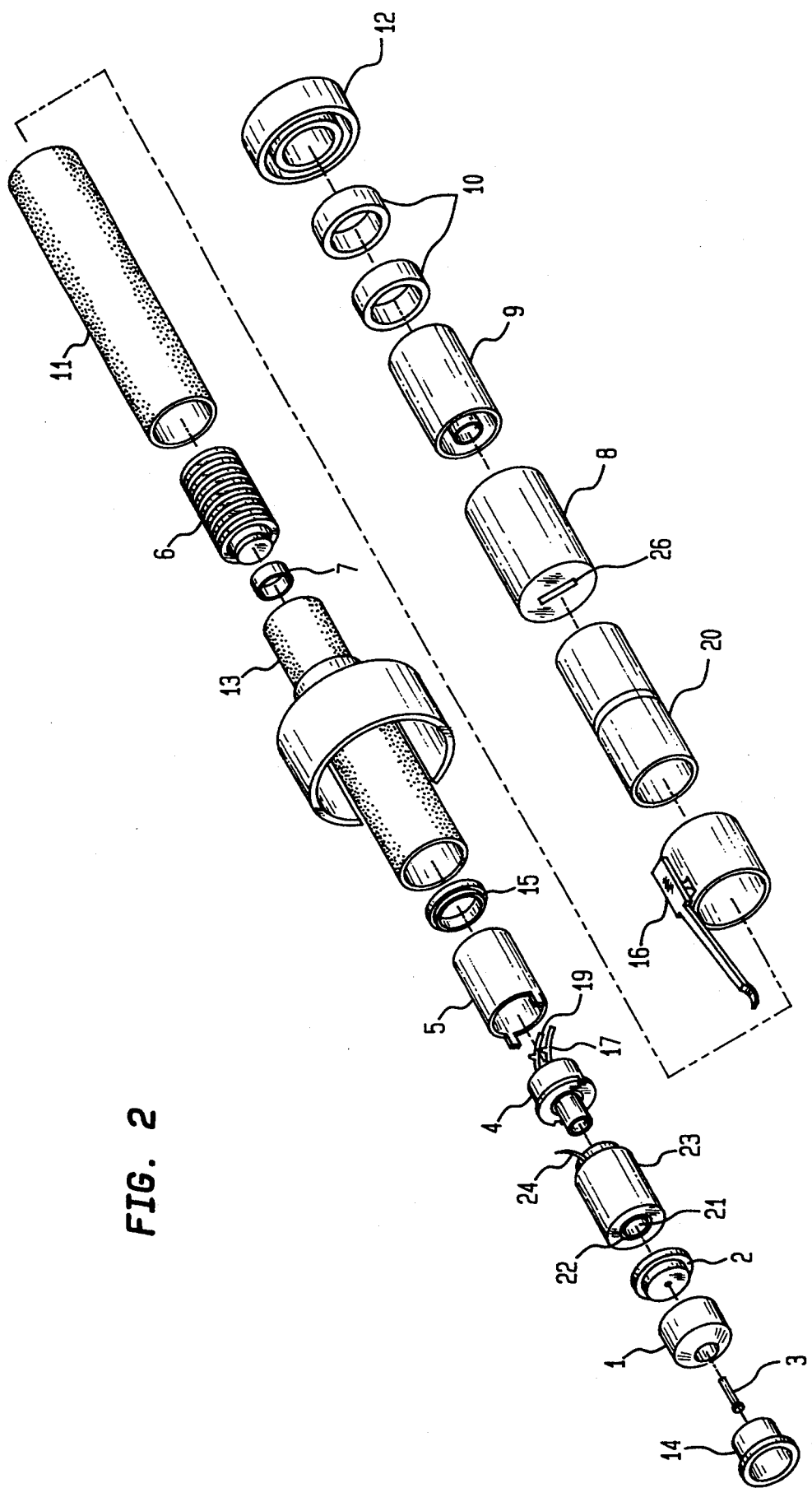
FIG. 2 is an exploded view of the same dosimeter as shown in FIG. 1.

Now referring to FIGS. 1 and 2, there is shown a cross-sectional and an exploded view of a dosimeter wherein like reference numerals represent similar elements. In a preferred embodiment of the invention, the device is similar to the dosimeter described in U.S. Pat. No. 4,306,154 and has split outer casing or barrel 11 and 13 that is made of carbon fiber filled with a liquid crystal polymer (LCP) or polyphenylene sulfide (PPS) both of which are plasma treated for approximately 24 minutes using nitrous oxide gas. Preferably, the outer casing or barrel 11 and 13 is made of a liquid crystal polymer, such as Hoechst Celanese Vectra A230, but other crystalline polymers may be used. In another embodiment of the invention, the casing molding of carbon fiber is filled with liquid crystal polymer which is impregnated with a solution of phenoxy molding pellets in cellosolve acetate. The casing or barrel sections 11 and 13 as well as the parts are sealed with an epoxy resin having a 1:1 ratio of resins to curing agent. An example of such an epoxy resin is a customized epoxy resin sealing formulation based on Shell Epon 828 resin and Shell V-40 curing agent mixed in a 1:1 raito. It is necessary for the present invention that all the components joined using the epoxy resins used are treated with the gas plasma to ensure that the device can withstand mechanical shock.

An ionization chamber 5 is disposed within the lower casing or barrel 13 and may also be formed of the same material as the lower casing or barrel 13. These materials are used because they have been found to be highly resistant to mechanical shock and impervious to moisture as well as provide a substantial uniform response to a wide range of ionizing electromagnetic radiation energies regardless of the direction of the impinging radiation. Further, like the polycarbonates (PC) used previously in dosimeters, the response of the materials used in the present invention are similar to the response of human tissue when exposed to low levels of neutron, gamma and x-ray radiations.

The lower casing or barrel 13 also has a threaded extension 6 which holds objective lens 7. This extension 6 may also be formed of the material as the casings 11 and 13. The objective lens is formed of a thermoplastic, such as phenoxy which is now made by Phenoxy Associates and is generally labelled PKFE. The term phenoxy when used in the present specification refers to polyhydroxyethers which are described in more detail in U.S. Pat. No. 4,711,817, which is incorporated herein by reference. In order to isolate the ion chamber 5, an objective window, which is also made of phenoxy, is sealed on one end of the ion chamber 5. Like the U.S. Pat. No. 4,306,154, this window also prevents the establishment of an extra cameral volume in the air space between the objective lens 6 and the top of the ion chamber 5. An insulator 4 is sealed at the opposite end of the ion chamber 5 from the objective window 15. The insulator 4 is preferably formed from a polystyrene which is impregnated with impurities, such as potassium persulfate, emulsifiers, and/or initiators. This material is preferred because the impurities form traps for free electrons which makes it is impervious to radiation damage. This material was developed by the Federal Emergency Management Agency (FEMA) and is generally reffered to as "FEMA Preferred Formula." Disposed on this insulator 4 and within the ion chamber 5 is a frame 17 and fiber 19. The objective window 15 is transparent to allow the image of the fiber 19 in electrometer to be seen through a hole in the ion chamber 5. Frame 17 of the electrometer is molded of aluminum into insulator 4. Charging pin 3, normally formed of stainless steel, is connected through an electrostatic shield 2 to make contact with the charge bar 22 of capacitor 23. The charging pin is held in place by means of diaphragm 1 and sealed with the resins mentioned previously. The diaphragm 1 and electrostatic shield 2 are both preferably made of transparent phenoxy and are formed such that light passes through the diaphragm 1 and is focused onto a lens (not shown) formed on the base of the insulator 4. The electrostatic shield 2 may also be made of an acrylic. The electrostatic shield 2 prevents any electrostatic field on the charging pin 3 from influencing the position of the fiber 19. The capacitor 23 has a capacitor 21 which is a wound dielectric film-foil capacitor which is formed from the insulating material described above and a metal foil or conducting plastic film. The capacitor 23 is electrically connected to the electrometer via contact 24. The diaphragm 1, electrostatic shield 2, capacitor 23, insulator 4 and the ion chamber 5 are sealed and fitted together and then this whole composite section is loaded into casing or barrel 13 by sealing the components to the sides of the casing or barrel 13 with the epoxy resin formulation mentioned above. An LCP end cap 14 is then used to seal the end of the dosimeter using the special 1:1 epoxy:curing agent formula resulting in the requiste ruggedness.

The upper casing or barrel 11 positions an eye piece formed of several different pieces. Specifically, a transparent eye piece cup 8 is fitted within the casing or barrel 11 via the above mentioned epoxy resin. At the end of the eye piece cup 8, a scale 26 is molded into the eye piece cup 8 to measure the amount of radiation exposure in milliroentgens. When light passes through the plastic material of the eye piece cup 8, the refraction of light by raised images of the scale 26 makes the scale visible. The eye piece cup 8 also serves to position eye piece lenses 10 of an optical system required to visualize an image of fiber 19 and to measure the fiber's movement with respect to the scale 26 so that the dosage can be determined. The function and further details of the structure of the electrometer are described in U.S. Pat. No. 3,993,950, which is incorporate herein by reference. Briefly though, the first eye piece lens is convex at the bottom and the second eye piece is convex at the top. Both of the lenses, according to the present invention, are formed of transparent phenoxy (mentioned above). This material provides excellent barrier properties against air and water even though it is amorphous in nature as opposed to crystalline. This is unusual as most materials of this nature have inferior barrier properties and degrade under extreme conditions. (However, some of these materials have excellent water vapor properties (e.g. polyethylene), but they are very transparent to air.) A spacer 9 is used to separate the lenses 10 to achieve the desired optical effect. Further, to strength and space the collective eye piece an upper barrel insert 20 is used. The entire eye piece is then sealed in the upper casing or barrel 11 with the epoxy resin and then end cap 12 is sealed on the device using epoxy.

By using the plasma treated liquid crystal polymer for the casings of the device, the special epoxy resin formulation for a sealer, and transparent phenoxy, the present dosimeter provides a greatly improved dosimeter for civil defence as well as military and industrial uses. With these improvements, the present invention can withstand substantially more mechanical shock and exposure to moisture and cold temperatures than any dosimeter previous described in the literature.

The present invention may also be used in Geiger-Mueller counters and proportional counters. Geiger-Mueller counters detect ionizing radiation, including gamma rays and x-rays, and alpha and beta particles. Such a counter typically comprises a glass tube about 2 cm in diameter enclosing a metal cylinder, often of copper, about 10 cm long. A thin metal wire, typically of tungsten, passes along the axis of the metal tube. The cylinder and wire are connected through an end wall of the glass tube to a source of electrical voltage. The tube is filled with a gas, usually a mixture of an inert gas, such as argon or neon, and halogen gas, such as chlorine or bromine, at a low pressure, e.g. a few centimeters of mercury. A high voltage, typically 500–1000 volts, is applied between the cylinder and the wire. The voltage must be a little less than that needed to create an electrical discharge between the two electrodes. When a charged particle of sufficient energy enters the tube, it causes electrons to discharge from the gas. These electrons, being negatively charged, are attracted towards the wire anode, and the atoms from which the electrons originated are attracted towards the tube cathode. The high voltage established between the anode and cathode creates a high voltage gradient that accelerates the liberated electrons sufficiently to further discharge more electrons from the gas, which in turn are accelerated by the high voltage to discharge still further electrons, thereby creating an avalanche effect. As this avalanche of electrons continues, the positive ion are also accelerated toward the tube cathode. The pulses coming from the tube are amplified electronically and are then counted by an electromechanical register.

Proportional counters comprise two electrodes in a surrounding of a desired gas at a desired pressure. Radiation entering the proportional counter ionizes the gas molecules therein to produce ions. The negatively charged ions produces will travel to the anode whereas the positively charged ions travel in the opposite direction to the cathode. The resulting output of the counter is a measure of the energy of the ionizing radiation which enters the ionization chamber.

Figure 3:
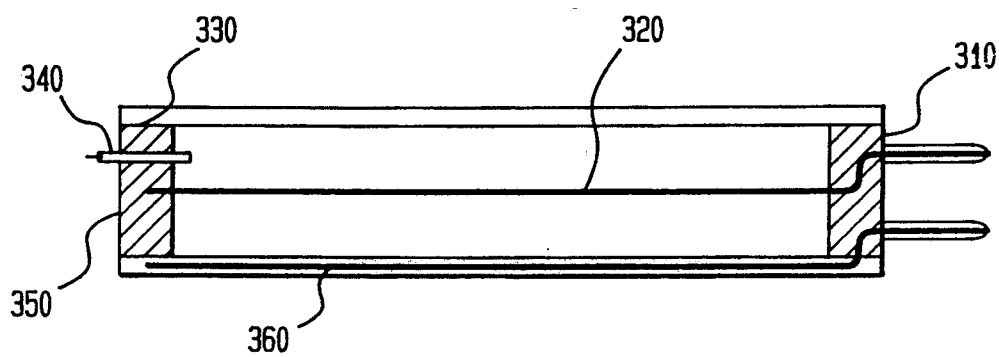
FIG. 3 is a cross-sectional view of a Geiger Mueller radiation detector.

According to the present invention and now referring to FIG. 3, shown thereat is a cross-sectional view of a Geiger Mueller counter. As shown, an electrically conductive, carbon filled, liquid crystal polymer tubing 360 encircles a wire 320. The ends of the tube are sealed with insulating liquid crystal polymer plugs 350 and 310 and an epoxy resin 330. The tube is then filled with gas via gas filling tube 340.

Figure 4:
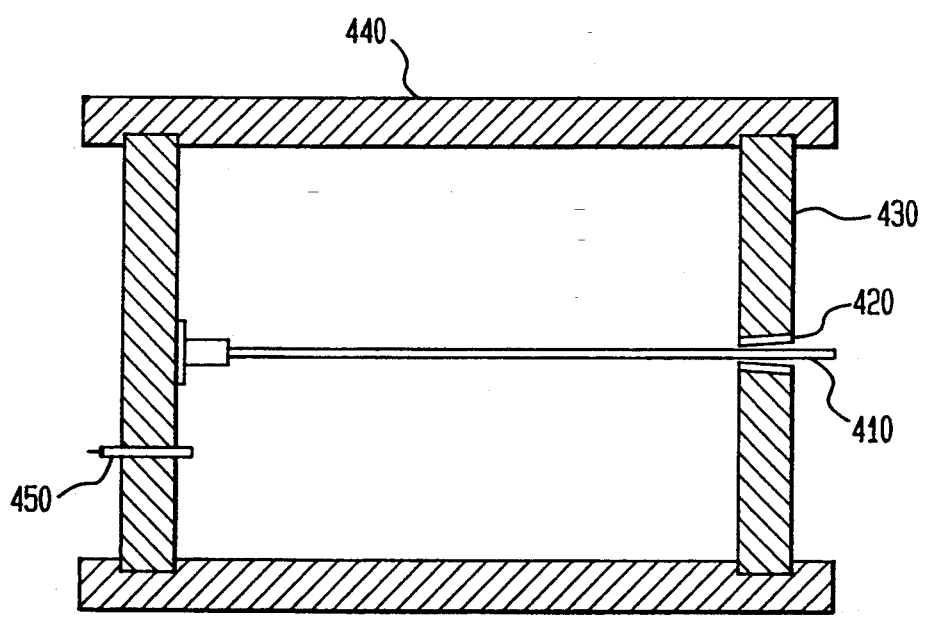
FIG. 4 is a cross-sectional view of a proportional counter.

FIG. 4 illustrates a proportional counter according to the present invention. As shown, an ion chamber is constructed from electrically conductive, liquid crystal polymer filled, carbon fiber walls 430 and 440. An electrode 410 is inserted into the chamber through insulator 420. Gas is injected into the chamber via insert tube 450.

The carbon material used for the tubing 360 of FIG. 3 and walls 430 and 440 of FIG. 4 is 30-50% carbon fiber and is filled with a liquid crystal polymer or polyphenylene sulfide. This material is plasma treated for approximately 24 minutes using nitrous oxide gas. Preferably, the liquid crystal polymer is Hoechst Celanese Vectra A230, but any liquid crystal polymer may be used as well as other crystalline polymers. In another embodiment of the invention, the tubing of carbon fiber and liquid crystal polymer is impregnated with a solution of phenoxy molding pellets in cellosolve acetate. The epoxy resin used for sealing the Geiger-Mueller and the proportional counters according to the present invention has a 1:1 ratio of epoxy resins to curing agent. It is necessary for the present invention that all exterior surfaces and the epoxy resins used in the seals are also treated with the gas plasma to ensure that the device can withstand mechanical shock.

Although the present invention has been described in relation to three particular embodiments, many other applications of the present invention and other uses will become apparent to those skilled in the art. Therefore, the present invention should not be construed to be limited by the specific disclosure herein, but only by the appended claims.

What is claimed is:

1. In a dosimeter of the type having a tubular barrel, an ionization chamber comprising an electrometer having a frame, optical means for viewing said electrometer, and means for charging said electrometer including a charging pin, all disposed within said barrel, the improvement comprising:
   said barrel is made of carbon fiber filled crystalline polymer which is plasma treated; and
   said optical means is comprised of at least one window, one charging switch diaphragm and at least two lenses which are made of a phenoxy resin;
   and said dosimeter is sealed with an epoxy resin formulation.

2. The dosimeter of claim 1 wherein said barrel is plasma treated with nitrous oxide.

3. The dosimeter of claim 1 wherein the crystalline polymer is a liquid crystal polymer.

4. The dosimeter of claim 3 wherein the liquid crystal polymer is impregnated with a solution of phenoxy molding pellets in cellosolve acetate.

5. The dosimeter of claim 2 wherein the phenoxy resin is also plasma treated with nitrous oxide.

6. The dosimeter of claim 5 wherein the epoxy resin has a 1:1 ratio of resins to curing agents.

7. In a radiation detector of the type comprising an ion chamber having a sealed outer casing, the improvement comprising:
   said sealed outer casing is made of a liquid crystal polymer which is filled to approximately 30% by weight of carbon fiber, the liquid crystal being plasma treated;
   said sealed outer casing is sealed with an epoxy resin.

8. The radiation detector of claim 7 wherein the radiation detector is a Geiger-Mueller radiation counter.

9. The dosimeter of claim 8 wherein said sealed outer casing is plasma treated with nitrous oxide.

10. The dosimeter of claim 9 wherein the liquid crystal polymer is impregnated with a solution of phenoxy molding pellets in cellosolve acetate.

11. The dosimeter of claim 10 wherein the epoxy resin has a 1:1 ratio of resins to curing agents.

12. The radiation detector of claim 7 wherein the radiation detector is a proportional radiation counter.

13. The dosimeter of claim 12 wherein said sealed outer casing is plasma treated with nitrous oxide.

14. The dosimeter of claim 13 wherein the liquid crystal polymer is impregnated with a solution of phenoxy molding pellets in cellosolve acetate.

15. The dosimeter of claim 14 wherein the epoxy resin has a 1:1 ratio of resins to curing agents.

* * * * *